C. Lloyd Smith,
Robert H. Van Vooren,
INVENTORS.

May 12, 1970   C. L. SMITH ET AL   3,511,452
SPINNING BODY ATTITUDE CONTROL
Filed Feb. 24, 1967   4 Sheets-Sheet 3
Fig. 5.
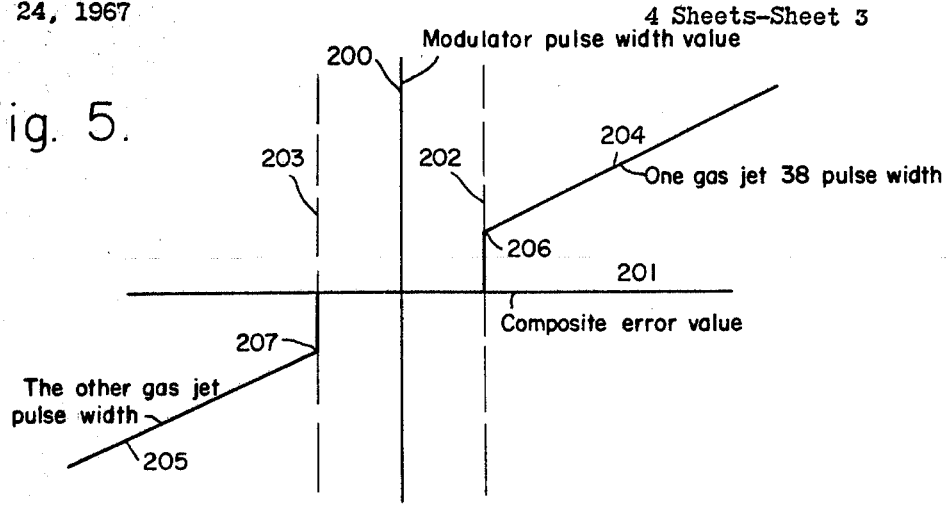
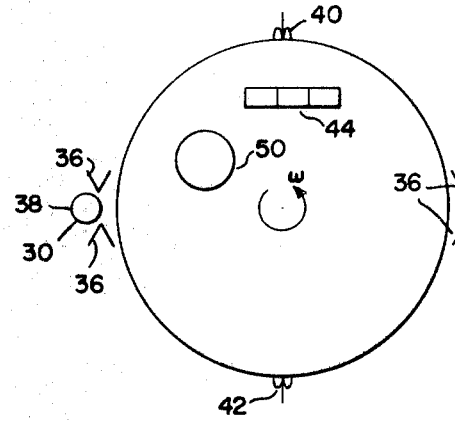
Fig. 3a.
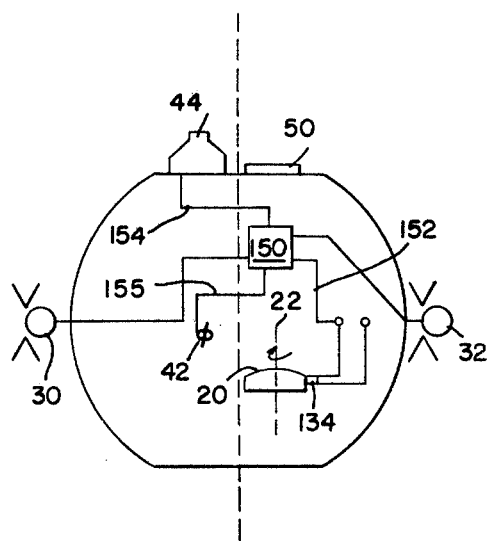
Fig. 3b.

3,511,452
SPINNING BODY ATTITUDE CONTROL

Cleon Lloyd Smith, Los Angeles, and Robert H. Van Vooren, Manhattan Beach, Calif., assignors to TRW Inc., Redondo Beach, Calif., a corporation of Ohio
Filed Feb. 24, 1967, Ser. No. 618,476
Int. Cl. B64c
U.S. Cl. 244—1                                16 Claims

ABSTRACT OF THE DISCLOSURE

Space vehicle control method and system featuring a reaction wheel or other mass rotating at a speed such that the total rotary momentum of the vehicle and wheel is substantially nil.

---

This invention relates to space vehicle navigation and attitude control, and in particular discloses a new method and system for orienting a spinning space vehicle and effecting precise changes in spin axis direction. Although the invention is mainly directed to improving space vehicle control systems, its principles may well find broader applications in other fields.

Often it is desired to have a space vehicle continuously point a certain axis at the body it is orbiting and at the same time rotate slowly about this axis. Formerly, this required periodic precessing of the angular momentum vector of the space vehicle. The invention herein disclosed consists of new and vastly superior attitude control techniques for pointing the spin axis of a spinning body toward a body about which it orbits.

Formerly, the body angular momentum associated with a spinning body was precessed at orbit rate in order to point the spin axis at the orbited body; and if the control torques were applied impulsively, wobble of the spin axis ensued. Moreover, the requirement of continual jet pulsing necessarily limits the in-orbit life of the satillite because of the large amount of reaction impulse needed and the wear of reaction equipment due to continual exercise. The techniques presented in this disclosure were devised to permit the control of a spinning vehicle without the large expenditure of control gas impulse heretofore required to precess the angular momentum and without incurring the wobble problems formerly associated with the control of spinning bodies. The disclosed techniques permit body rotation for payload scanning, thermal control, and elimination of certain kinds of disturbance moments.

Also, the techniques presented in this disclosure were devised to simplify the equipment needed to provide the control actions required about two inertial coordinate axes compared to the equipment needed for the control of a non-rotating body. The specific application utilized as an example for the attitude control techniques herein disclosed is an earth orbiting satellite; but, as indicated above, they are applicable to the larger class of spinning body control.

The techniques and system concepts originated with this invention provide control in the presence of body spin, giving thermal and payload scanning advantages over a non-spinning body without the penalty of large total control impulse for precession of a momentum vector. Their basic principle is to reduce the net satellite momentum to zero, so that it behaves as an inert (non-spinning) body. As a result, the body does not wobble in response to control impulse and may be reoriented without precession.

The disclosed techniques also effectively decommutate the spinning reference frame so that control can be effected in two-dimensional quasi-inertial space even though control torque pulses are applied about a single, body-fixed axis. The application of the control torques in a single control plane which is time shared to effect control in two quasi-inertial planes materially reduces the complexity of the control system, eliminating, for example, one set of attitude sensors and control torquers that would otherwise be required.

Therefore, the main object of this invention is to provide an improved space vehicle or satellite control method or system which overcomes the problems mentioned above. In the achievement of this and other objects and as a feature of the invention applicants use a control system including a counter-rotating reaction wheel or other mass whose spin axis is parallel with the proposed spin axis of the satellite. An attitude sensor and control gas jets are arranged to measure spin axis orientation errors and apply control torques respectively about a single body-fixed axis normal to the spin axis. Satellite spin speed relative to inertial space (say relative to the sun or stars) and reaction wheel speed relative to the satellite are controlled by auxiliary means to the relationship which ensures zero net angular momentum.

The control system preferably operates on the sensor errors in the following manner. Errors are sampled four times per spin revolution in close synchronism with the spin period. This can be done either by a clock with knowledge of the actual spin speed (or its control reference) or by the counter-rotating wheel based upon the rotation of a fixed number of revolutions and knowledge of the moment of inertia of the wheel and spacecraft. The first and third error samples represent errors about the same axis in a particular direction in inertial space in spite of the satellite spin. The second and fourth samples represent errors about a quasi-inertial axis orthogonal to the first. Thus by treating odd numbered and even numbered samples separately, errors can be derived in a quasi-inertial cartesian coordinate frame which remains virtually fixed relative to the reference body toward which the spin axis is controlled to point, e.g.—the earth. Successive odd numbered and successive even numbered samples are subtracted, their difference representing attitude error rate about the respective quasi-inertial axes. Thus at each sample instant, both attitude error and its rate are available to the system.

At each sample instant the weighted sum of error and error rate is applied to a threshold device and, if the threshold is exceeded, a corrective pulse of duration proportional to the excess is applied by the control gas jets. Although errors are detected and control action is taken at the sample instants about only one body axis, the effect of acting at times separated by one quarter of the spin period is that of two-axis control. This is one novel characteristic of the control system. Only the attitude registers (or memory devices) for each quasi-inertial axis are needed and all other equipment is time shared.

The corrective gas jet torques are applied impulsively in bursts of duration short compared with the spin period. Because the counter-rotating reaction wheel ensures that zero net angular momentum is present in the system as a whole, the body responds to each gas jet impulse as if it were not spinning; i.e.—it responds by changing inertial attitude rate proportional to the gas jet pulse duration, without the wobble usually created in spin stabilized vehicles. When the spinning satellite moves about its attitude reference (usually, the earth) as it must in orbit, the spin axis requires constant reorientation to keep it pointed at the reference. If no counter-rotating wheel were present, the spinning satellite would exhibit considerable angular momentum along its spin axis which would have to be precessed with great expenditure of control impulse as the body moved about its reference. With the counter-rotating wheel the net system momentum is zero requiring no control impulse for the continual reorientation. The spacecraft and reaction wheel spin rotation speed relations which ensure zero net angular momentum are as follows. The total system (spacecraft and wheel) angular momentum is $$H = J(\omega + \Omega) + I\omega$$

about the nominal spin axis, where:

H = total net angular momentum
J = moment of inertia of the reaction wheel
$\Omega$ = rotation speed of the reaction wheel relative to the body about axis 22
I = moment of inertia of the spacecraft less reaction wheel
$\omega$ = rotation speed of the spacecraft about axis 12

For zero net momentum (H=0) the reaction wheel and spacecraft rotational speeds must stand in the relation $$\Omega = -\frac{I+J}{J}\omega$$

In short, this invention teaches a new control system which, through a synchronous error sampling process, is able to orient a spinning satellite as if control were being effected by a controller mounted on a stationary weightless gimbal with pivots coaxial with the spin axis; and the counter-rotating wheel in the satellite reduces the effective net angular momentum to zero, thereby causing the body to behave as if inert, relieving the controller of coping with spinning body dynamics, and obviating the requirement for large expenditures of gas and large corrective impulses. All in all, this provides a lighter and more simple control system which is still more accurate than those presently used.

Other objects and features of this invention and a better understanding thereof may be had by referring to the following description and claims, taken in conjunction with the accompanying drawings, in which:

FIGS. 3a and 3b are schematics in two elevations of a spacecraft control system according to the invention;

FIG. 5 illustrates the attitude control law implemented by the electronics of FIG. 4.

Figure 1:
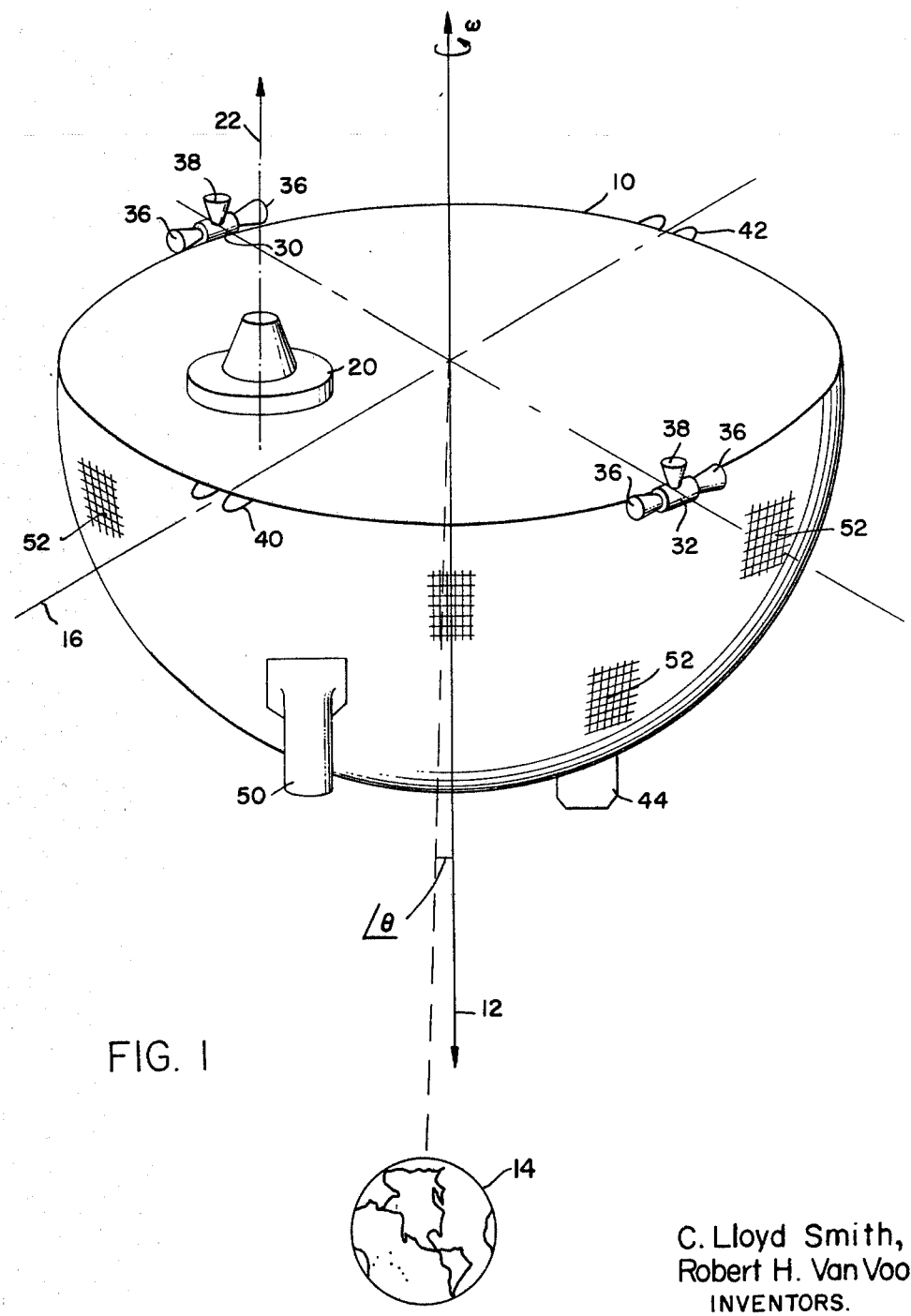
FIG. 1 is a perspective view of a spinning satellite which uses a control system according to this invention.
Figure 2:
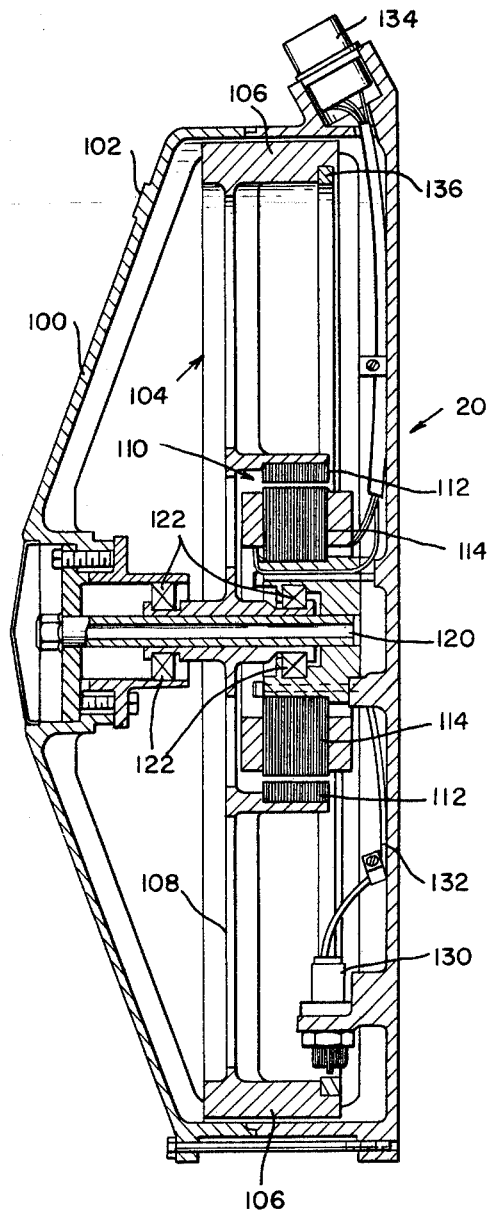
FIG. 2 is a detail side elevation in cutaway of the reaction wheel portion of FIG 1.

Referring to FIG. 1, a space vehicle 10 in which the applicants' reaction wheel control principles and overall reaction wheel control system concepts might be employed is designed to spin about an axis 12 at an angular rate $\omega$. The spacecraft 10 must maintain its spin axis 12 pointed to the center of the reference body 14 (usually, the earth) about which it is orbiting. Ordinarily the angular momentum of the satellite about axis 12 would tend to stabilize the satellite in inertial coordinates, and an inertially fixed torque would be required to precess the spin axis to maintain it pointing toward the earth as the satellite revolves in orbit. If the precession torque were applied impulsively (a common convenience in spinning systems) spin axis 12 wobble would be induced. Similarly wobble would be induced by impulsively accelerating the spinning body along a line 16 not passing through the center of mass, as for example might be needed to adjust the orbital velocity. These sources of spin axis wobble and the need for precessional torque to maintain earth pointing are eliminated by the present invention. This is accomplished by eliminating the satellite 10 angular momentum by using a counter rotating reaction wheel 20 rotating about axis 22. An example of a reaction wheel 20 is shown in FIG. 2. Its axis of rotation 22 need not be coaxial with the satellite spin axis 12 but it must be substantially parallel to it. Indeed, the reaction wheel 20 can be located anywhere on or in the spacecraft 10.

Other elements in the spacecraft control system include two diametrically opposed gas jet clusters 30 and 32, each of which has two opposed rotation-plane jets 36 and one control jet 38. The jets 36 and 38 may be of any variety of known gas propulsion devices now used for fine adjustment of spacecraft velocity, rotation, or attitude. The rotation plane jets 36 thrust along axes perpendicular to the spin axis and displaced from the spin axis 12 by some distance representing a moment arm. Thus differential action of diagonal pairs of jets 36 produce torque about the spin axis 12 for spin speed control. The control jets 38 thrust along axes parallel to the spin axis 12 but separated from it by some moment arm. Thus actuation of one jet 38 produces a transverse control torque about the spacecraft line 16, perpendicular to the spin axis. Actuation of one jet 38 or the other then permits positive or negative changes in spin axis orientation by rotating about line 16 (the body-fixed control axis).

In order for the jets 30 and 32 and the reaction wheel 20 to cooperate in stabilizing the attitude of the spacecraft 10 the spacecraft requires two types of sensors: a pair of sun sensors 40 and 42 diametrically opposed to one another and viewing in the same plane containing the spin axis 12 and the body-fixed control axis 16, and an earth sensor 44 mounted near the bottom of the spacecraft 10. The earth sensor must measure spacecraft earth pointing angle $\theta$ in a plane containing both the axis of rotation 12 and the two jet clusters 30 and 32. It views downward toward the earth 14 but need not be mounted directly on the axis of rotation 12. The purpose of the sun sensors 40 and 42 is to measure the spacecraft spin rotation rate about axis 12 so that speed corrections can be applied by torques from the gas jets 36. The purpose of the earth sensor 44 is to sense deviation of the axis of rotation 12 from a line through the center of the earth 14 or other body, denoted by deviation angle $\theta$. Once these errors are measured the reaction wheel 20 and the jet clusters 30 and 32 alone can make all the necessary corrections.

The purpose of a system such as has been described in connection with FIG. 1 is to provide a spacecraft which can carry an earth scanning payload, here denoted 50, for very long periods of time and can cause the payload 50 to scan the entire surface of the earth by slowly spinning it about the axis of rotation 12. The requirement of long life of the spacecraft 10 makes it highly desirable to minimize the use of the jets 30 and 32 in maintaining precise attitude and spin control, since once jet gas has been expended it cannot be recovered or replaced. On the other hand, the electricity consumed by the reaction wheel 20 can be replaced by the solar cells 52 of the space vehicle 10. So economical is the reaction wheel control system of this invention that action of the jets 30 and 32 could be continued for many times the life of some of the other critical elements in this spacecraft—a period of several years.

In the operation of the spacecraft 10, the rotation plane jets 36 are used for controlling the spin rotation speed of the spacecraft. In one spacecraft according to FIG. 1, the jets 36 had thrust levels of 0.05 lb. and the jets 38 had thrust levels of 0.02 lb.; both were actuated with minimum electrical pulse widths of 50 milliseconds. The sun sensors 40 and 42 were employed in spin control, and had a field of view approaching 180° in the plane of the axis of rotation 12 and axis of control 16. These sensors 40 and 42 were located to an accuracy of ±0.5° with respect to the plane of the control jet clusters 30 and 32 and the axis of rotation.

The earth sensor 44 is used both for control and for reading out the earth pointing deviation angle $\theta$, in order to permit the computation of spacecraft attitude and the correction of data in the payload 50 for variations in spacecraft attitude. The earth sensor 44 views the earth roughly parallel to the rotation vector 12.

Ordinarily the payload 50 also views the earth 14 along an axis substantially parallel to the axis of rotation 12. The output of the earth sensor 44 is sampled in synchronism with the spin axis period to yield discrete measurements of spin axis orientation relative to the earth 14 necessary for control through the gas jets 38.

In one spacecraft, according to FIG. 1, the required zero net momentum condition was achieved by maintaining the counterrotating reaction wheel 20 speed constant relative to the spacecraft 10, and controlling the rotation speed of the spacecraft 10 to the necessary value relative to inertial space (the sun). The latter was accomplished by measuring the spacecraft rotation speed relative to the sun by observing the time interval between indications of the two sun sensors, and comparing the measured value with a standard, desired value previously determined to result in zero net angular momentum. The difference between measured and desired value represents rotation speed error and was used in the referenced design application to actuate the spin control gas jets 36 to correct the error. The reaction wheel 20 speed was maintained constant by an auxiliary control system onboard the spacecraft. The details of the operation of the spacecraft rotation speed control and the reaction wheel speed control are discussed in connection with FIGS. 2 through 4. Subsequently, the details of the earth-pointing controller will be discussed in connection with FIGS. 4 through 5.

Referring to FIG. 2, the reaction wheel 20 of FIG. 1 used in one application of this invention is shown therein to be made up of a number of major components, the outermost of which is a housing 100 which is hermetically sealed and filled at 102 with a special atmosphere. In one reaction wheel system used in the practice of this invention, the atmosphere was 98% argon and 2% oxygen at 40% atmospheric pressure. The reaction wheel at 104 is composed of a rim 106 of relatively heavy material, born upon a hub assembly 108 of some very light material. The hub assembly 108 is in turn mounted to rotate with an electric motor 110 having a rotor 112 integral with the fly wheel 104 and having a stator 114 integral with the housing 100. The flywheel 104 and rotor 112 combination rotates upon a shaft 120 held by bearings 122.

Included in the housing assembly 100 is a magnetic pick-off 130 which is electrically connected by wiring 132 to a hermetically sealed receptacle 134 for conducting tachometer—type signals to the outside circuitry of the control system. In one reaction wheel built in the reduction to practice of this invention, the tachometer output at 134 was eight pulses per revolution of the wheel 106. The tachometer 130 was a small permanent magnet about which a coil was wound, mounted to the reaction wheel case 100 adjacent to the inner edge of the flywheel ring. A soft iron ring 136 around the circumference of the wheel 106 passes adjacent the magnetic pickup 130. Magnetic tachometer pulses are generated in the pickup 130 by periodic spacing of air gaps in the ring 136. Thus, as the flywheel 106 and soft iron ring 136 rotate past the pickup 130, an abrupt change of magnetic field due to the passage of an air gap will generate a large voltage pulse in a wire surrounding the small tachometer magnet. In one reaction wheel assembly 20 that was built, there were eight air gaps in the soft iron ring 136.

Figure 4:
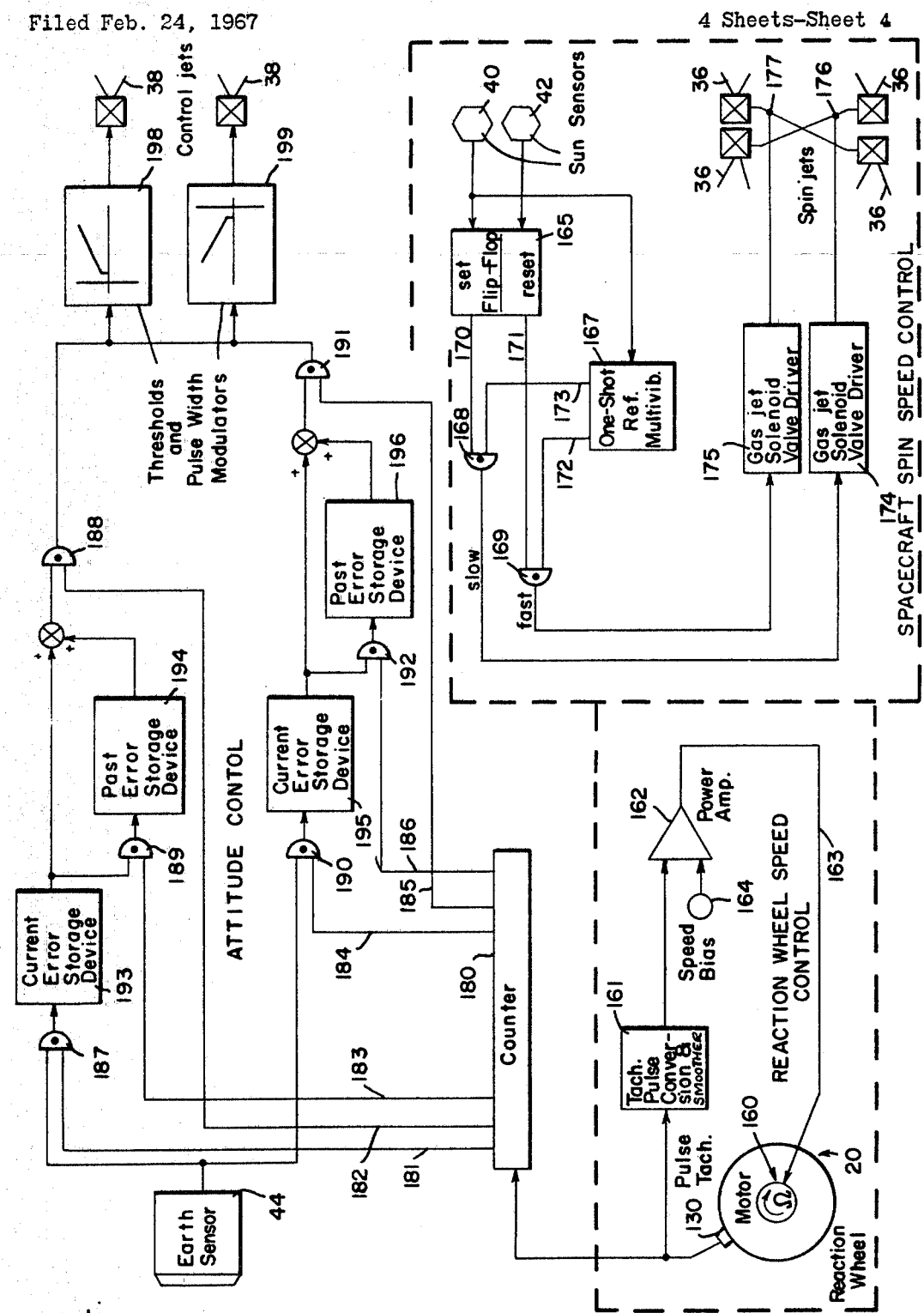
FIG. 4 is a block diagram of an attitude control, reaction wheel speed control and spacecraft speed control electronics subsystem for use in the control system of FIG. 3.

The schematic views of FIGS. 3a and 3b show the location of the various elements discussed in connection with FIGS. 1 and 2. FIGS. 4 and 5 then disclose in detail how this "hardware" functions in the control system through the action of the spacecraft control electronics 150. Inputs to the electronic system 150 include tachometer system signals from the reaction wheel 20 through the line 152, attitude signals from the earth sensor 44 through the line 154, and rotation speed signal from the sun sensors 40 and 42 through lines 155. With these signals, the electronics 150 generates control signals for the jets 30 and 32 and the reaction wheel motor 110. The control system electronics 150 is shown in greater detail in FIG. 4.

The FIG. 4 represents the control electronics system 150 which provides attitude control and control of both spacecraft and reaction wheel rotation speeds. It accepts signals from the reaction wheel tachometer, the earth sensor and sun sensors, and actuates the gas jets and applies electrical power to the reaction wheel motor as required to maintain control.

Control of the speed of the reaction wheel 20 is accomplished by varying the supply of current to an electric motor herein designated 160, which drives the reaction wheel 20. The motor is driven by electric power from a power amplifier 162 which amplifies feedback signals from a reaction wheel tachometer 130 and a fixed bias signal which is added to the tachometer signal. The tachometer signal from the tachometer 130 is converted to an analog representation of reaction wheel rotation speed in a digital analog converter and smoother 161. It is then applied to the input of a power amplifier 162 along with a fixed bias signal from 164. The power amplifier 162 then drives the reaction wheel motor 160 causing it to rotate. Under the action of the fixed bias and tachometer (speed) feedback signals the power amplifier 162 will cause the reaction wheel speed to assume some fixed value determined by the magnitude of the bias. In one spacecraft control system of this type already reduced to practice the reaction wheel rotation speed was maintained constant at 500 r.p.m.

An additional possible refinement is to monitor the exact rotation of the space vehicle of FIG. 1, such as by sensing the time for the sun sensors 40 and 42 to make one rotation. This spacecraft rotation signal can then be applied at 162 or elsewhere to vary the speed of wheel 20 from the nominal r.p.m. established by the loop 130–161–164.

The discrete tachometer pulses from 130 are also used in the attitude control portion of the system to indicate the angle of spacecraft rotation about its spin axis 12. Since the spacecraft and reaction wheel moments of inertia are well known and since the spacecraft system has zero net angular momentum, each revolution of the reaction wheel represents some known fraction of a spacecraft revolution. In particular, for a tachometer which produces $n$ pulses per revolution of the reaction wheel, the total number of pulses N generated per revolution of the entire spacecraft will be $$N = n \frac{I+J}{J}$$

where:

N = number of tachometer pulses per spacecraft revolution
$n$ = number of tachometer pulses per reaction wheel revolution
I = spacecraft moment of inertia about its spin axis 12
J = reaction wheel moment of inertia about its rotation axis 22

Since all quantities in the above equation are measurable, the system can be designed to take advantage of the inherent synchronizing capabilities. Thus, the earth sensor output signals, which must be sampled every 90° of spacecraft rotation, can be sampled after every N/4 pulses are emitted by the reaction wheel tachometer. The quantity N/4 and its multiples are formed in a counter 180 by counting tachometer pulses. The use of this counter will be described later in connection with the attitude control system.

The spacecraft rotation (spin) speed control system operates in connection with the reaction wheel speed control loop to meet the overall conditions for zero net angular momentum of the entire system. As has been explained this is accomplished in one reduction to practice of this invention by maintaining constant reaction wheel speed relative to the spacecraft body and constant predetermined spacecraft rotation speed relative to the sun (inertial space). The speeds must stand in the relation $$\omega = -\frac{J}{I+J}\Omega$$

as explained before. The reaction wheel speed control loop 130–161–164 maintains the fixed reaction wheel speed $\Omega$, and the spacecraft rotation speed controller here described must maintain fixed spin speed $\omega$ relative to the sun. A preferred spacecraft spin speed controller operates as follows.

The pulse signals emitted by each sun sensor 40 and 42 when the sun crosses their plane field of view due to body rotation are applied to a bistable flip-flop 165. One sun sensor 40 is connected to the "set" input of the flip-flop 165 and the other sun sensor output 42 is connected to the "reset" input of that flip-flop. Thus, as the spacecraft rotates, a flip-flop output line 170 will be energized for exactly one half of the spin rotation (as the two sun sensors view diametrically opposite one another).

The duration of the "on" (line 170 energized) and "off" (line 171 energized) states of the flip-flop 165 are monitored by two logical AND gates 168 and 169 which compare them to the duration of a reference one-shot multivibrator 167. The multivibrator 167 is triggered by the sun crossing pulse from sun sensor 40 only, and emits an output pulse (line 172 energized) of fixed, predetermined duration. When it is "off" its output line 173 is energized. This time duration from 167 is that corresponding to the desired time of spacecraft rotation through one half revolution. Thus, if the zero net momentum relations demand that the spacecraft spin at a rate of one revolution each 64 seconds, the reference multivibrator would be adjusted to emit a pulse of 32 second duration starting at receipt of the sun sensor 40 pulse. If the spacecraft spin speed is exactly correct the flip-flop 165 output line 170 and line 171 will be alternately energized for 32 seconds each.

The logical AND gate 168 will gate "on" whenever flip-flop 165 line 170 and multivibrator output line 173 are energized at the same time. It remains gated "on" for the duration of the pulse overlap of the two devices 167 and 165; the duration is a measure of the spin speed error in the "too slow" sense. The logical gate 169 gates "on" when flip-flop "off" output line 171 and reference multivibrator "on" line 172 are energized simultaneously. Its gating duration measures the excess of the reference pulse duration over the sun sensor flip-flop (half revolution) duration, which represents spacecraft spin speed error in the "too fast" sense. The outputs of gates 168 and 169 lead to two gas jet solenoid valve drive switches (electronic) 174 and 175 respectively. The valve drive switches in turn actuate two solenoid valves represented at 176 and 177 of the spin control gas jets 36. Because the duration of the gate outputs is proportional to speed, control is exercised. For example, if gate 168 measured an overlap of one second it would indicate that the spacecraft revolved its one half revolution one second too slow (out of 32 seconds nominal) and one pair of corrective gas jets 36 would be actuated for one second. The gas jet thrusts are so chosen that the control gain resulting from this simple control law is a stable one, i.e.—so that a one second burst produces a spin rate change of less than $\frac{1}{32}$ of nominal.

The unique attitude control system herein disclosed orients the spin axis 12 of the spacecraft 10 toward a reference body 14 (the earth) by a technique of sampled pointing errors and impulsive gas jet corrections synchronized with the spacecraft rotation. Earth pointing errors are measured in spacecraft coordinates (about body line 16) by the earth sensor 44. Control torques of one sign or the other are applied impulsively by gas jets 38. The instants of error sampling and correction are synchronized with spacecraft spin rotation angle by means of a reaction wheel tachometer pulse counter 180 which indicates the instants corresponding to spacecraft rotation increments of 0°, 90°, 180°, and 270° from an arbitrary angle reference. By so defining the sample instants, error samples are taken and corrections are made in a set of virtual quasi-inertial cartesian coordinates impressed on the center of the reference body 14. In addition to attitude error measurements, attitude rate measurements are made at the sample instants by subtracting successive error samples in each of the two directions (0° and 180°, and 90° and 270° of rotation). For this process temporary error measurement storage is necessary.

Referring to the diagram of FIG. 4, the error sample and correction instants are determined by the counter 180 which counts reaction wheel tachometer pulses from 130. In one system of this kind reduced to practice the relative inertias of the spacecraft and reaction wheel were such that 16,000 tachometer pulses were emitted per spacecraft revolution. In this case 4,000 pulses are counted every time the spacecraft rotates through 90° about its spin axis 12. Thus sample instants are defined at 4,000 counts and 8,000 counts. The counter is allowed to overflow at 8,000 counts and start again. This results in sampling at each 90° of spacecraft rotation.

Each sample "instant" actually comprises a sequence of three closely spaced instants derived from successive counts of the counter 180. The action about one such sample time consisting of three successive instants will serve as an example. Consider the sample time corresponding to one particular spacecraft rotation phase angle (assume this is named 0°). At this time, identified by a count of 4,000 in the counter 180, earth point error about one quasi-inertial coordinate axis is to be sampled. At the instant that a count of 4,000 is reached, counter output line 181 is energized, gating the earth sensor measurement value through AND gate 187 and storing it in a storage device 193 (perhaps a digital register). At the next count of 4,001 (a very short time later) counter output line 182 is energized opening AND gate 188 for a short time. The next count (4,002) will energize counter output line 183 gating the stored earth sensor error measurement from 193 to storage device 194. The outputs of error storage devices 193 and 194 are added to form a composite error, sampled at the second of the three counts (4,001) by gate 188. This composite error sample will consist of a weighted sum of current attitude error and derived error rate averaged over the previous half revolution of the spacecraft. This is true on every sample occasion except the first. The composite error is next applied to threshold, sense detection and pulsewidth modulator electronics (198 and 199), and the pulse modulator output is used to actuate one or the other control gas jets 38 to apply a corrective torque impulse. Before proceeding with the description of that portion of the attitude control loop, however, the action of the three rapid samples and the temporary error storage devices in producing attitude-plus-rate signals must be discussed.

The overt action of the three rapid "subsamples," in which counter output lines 181, 182 and 183 are energized in short, sequential pulses, is to temporarily store the current earth sensor error measurement, sample the composite error signal from gate 188 for control use, and then shift the current earth pointing error value from storage 193 to storage 194 for retention until the next control sample of that axis, 180° later in spacecraft rotation. Thus, after at least one such sequence, the system will, upon the next sampling by lines 181 and 182, contain the *current* pointing error value in storage device 193 and the *past* value of pointing error in storage device 194. This is important to the rate derivation process. The storage device 194 does not retain all of the value shifted into it by gate 189, but always contains a value less than that received from storage unit 193 by a fixed amount. This is accomplished by roundoff in a digital unit or by right shift; in an analog unit it can be achieved by attenuating the output of 194.

The addition of the current pointing error and a fraction of the previous pointing error (taken at the previous time that axis was sampled) produces a total which represents a combination of attitude error and error rate. The attitude error is current and the rate error is the average over the previous half revolution of the spacecraft. If the current sample error is called $\theta_1$, and the previous sampled error (taken 180° of spacecraft rotation earlier) is denoted by $\theta_0$, then the sum of attitude error and a fraction $k$ of rate error is $$\theta_1 + k/T(\theta_1 + \theta_0)$$

where T is the half rotation time period. The terms $\theta_1$ and $\theta_0$ are summed rather than subtracted in the rate term above because they are measured with the same earth sensor in opposite directions, due to the 180° spacecraft rotation which occurred between them. Thus the error rate has been computed by effectively subtracting successive error samples in the same direction and dividing by the time interval separating them. The above relation can be rearranged to conform to the actual process depicted in FIG. 4. It is equivalent to writing the sum $$\left(1 + \frac{k}{T}\right)\left[\theta_1 + \frac{1}{1 + \frac{T}{k}}\theta_0\right]$$

This is performed by the addition of the value stored in 193 and the attenuated value stored in 194, resulting in a composite error signal for control use having the requisite rate term for damping.

When the composite error is sampled by gate 188 a corrective control torque must be generated by the system. To accomplish this the sampled composite error value is applied to a combination of two attitude control jet actuation units denoted as 198 and 199. The first function performed by each of these units 198 and 199 is that of level detectors, one for each possible sense of the error signal. Positive or negative composite error values in excess of threshold value appear at the output of one or the other unit of the pair. The output of each (only one can have an output at any one time) is applied to the input of a pulse width modulator, the second functional unit of each unit 198 and 199. This device generates a rectangular electrical output pulse of duration proportional to its input level, i.e. the composite error excess from the threshold device.

The electrical pulse of adjusted width emanating from an actuating unit 198 or 199 is used to actuate the appropriate corrective control gas jet 38 by energizing its solenoid valve. Thus a burst of gas produces a corrective torque impulse of magnitude proportional to composite pointing error in excess of the threshold value. The magnitude of the threshold value determines both the pointing accuracy and the rate of control gas consumption, the two results conflicting with each other. On one design reduced to practice the threshold of composite error was set at 2°, and the control gas supply storable on the small satellite was sufficient for a three year life in orbit.

The action of the remainder of the attitude control portion of the system is identical to that described above, except that samples are made at counts 8,000, 8,001 and 8,002 of the counter 180. The samples and corrections made at the two sample occasions (near counts of 4,000 and 8,000) effect full, two axis control of the orientation of the spacecraft spin axis 12. This is accomplished using only one pair of control gas jets 38 and one single-axis earth sensor 44. Exact orientation of the spin axis 12 to zero error is not attempted in the above-described system; the orientation is allowed to wander within the threshold error value set by the threshold devices 198 and 199. During the operation of the attitude control system any disturbances which cause the spacecraft spin speed or the reaction wheel rotation speed to vary from their design values are automatically corrected by their respective control loops.

FIG. 5 shows the behavior of the attitude control jet actuation units 198 and 199, including their two composite error threshold devices and their pulse width modulators. It is a plot of gas jet (modulator output) pulse width along the ordinate 200 against composite error value along the abscissa 201. The dashed lines 202 and 203 indicate the threshold values within which no pulses are generated. The characteristic 204 shows the pulse width emitted by one control jet 38 versus composite error value (positive). The characteristic 205 shows the pulse width emitted by the other gas jet 38 versus negative composite error. The knees of the two characteristics at 206 and 207 indicate the minimum pulse widths that can be emitted. These values are determined by the gas jet solenoid valve characteristics. In one design reduced to practice the minimum pulse widths attainable were 10 msec.

Thus applicants have achieved an improved spacecraft attitude control system which permits great saving in control jet fuel by nulling the total rotational inertia of the spacecraft system, using the reaction wheel 20 or its analog. Since the wheel 20 is powered by electricity, which a spacecraft can generate easily and for long periods, its operation will not limit spacecraft life as severely as control jet operation has in the past. This factor is especially important in earth-pointing space vehicles where the angular momentum must be precessed.

It can be seen that applicants' inertia-nulling principles can be applied to any type of rotary device which it is desired to operate at nil rotational momentum.

We claim:

1. A control system for a space vehicle having a body structure and having means for imparting to said body structure a rotary motion about a certain axis of rotation, said control system including:
   a first control jet mounted upon said body structure, said first control jet having a thrust axis parallel to but separate from said axis of rotation,
   a second control jet mounted upon said body structure, said second control jet having a thrust axis parallel to the thrust axis of the first control jet,
   the thrust axis of said second control jet being located the same distance from said axis of rotation as the thrust axis of the first control jet and directly opposed from the thrust axis of the first control jet,
   means for sensing the rotational velocity of the space vehicle,
   means for sensing the orientation of the axis of rotation of the space vehicle,
   a reaction wheel mounted to said body structure, said reaction wheel having an axis of rotation substantially parallel to the axis of rotation of the space vehicle,
   an electric motor mounted to impart rotary motion to said reaction wheel for generating a zero net angular momentum of the space vehicle, and
   means connected to the means for sensing the orientation of the axis of rotation of the space vehicle and to the first and second control jets for activating the first control jet or the second control jet to make changes in the orientation of the axis of the space vehicle.

2. The control system according to claim 1 with the following additions:
   third and fourth control jets mounted upon said body structure, the thrust axes of said third and fourth control jets being coaxial and opposed and located in a plane perpendicular to the axis of rotation of the space vehicle, fifth and sixth control jets mounted upon said body structure, the thrust axes of said fifth and sixth control jets being coaxial and parallel to the thrust axes of the third and fourth control jets and opposed, the thrust axes of the third, fourth, fifth, and sixth control jets being displaced from the center of mass of the space vehicle, and means connected to the means for sensing the rotational velocity of the space vehicle and to the third and fifth and to the fourth and sixth gas jets for activating said gas jets to make changes in the rotational velocity of the space vehicle causing it to rotate at such a speed that the total net angular momentum about its rotational axis is zero.

3. In a space vehicle, a control system including:

first means for imparting rotation to said space vehicle, said first means being arranged to cause said space vehicle to rotate at a first angular momentum about a first axis of rotation, a rotatable mass mounted to rotate relative to said space vehicle about a second axis of rotation, said rotatable mass being positioned relative to said space vehicle such that the second axis of rotation is parallel to the first axis of rotation, second means for imparting rotation to the rotatable mass at a controllable rate whereby said rotatable mass has a second angular momentum, third means for controlling the second means to cause the second means to impart rotation to the rotatable mass at a rate whereby the sum of the first angular momentum and the second angular momentum is approximately zero.

4. The control system according to claim 3 with the addition that the first axis of rotation is separated from the second axis of rotation.

5. The control system of claim 3 with the addition of fourth means connected to the third means for sensing the velocity of rotation of the space vehicle and causing the third means to vary the rate of rotation of the rotatable mass as a function of the velocity of rotation of the space vehicle.

6. The control system of claim 3 with these additions:

said first means for imparting rotation to said space vehicle has the property of maintaining space vehicle rotation at a constant rate of rotation, and said third means controls the second means to impart rotation to the rotatable mass such that the rotatable mass rotates at a constant rate of rotation.

7. The control system of claim 6 wherein the first means includes a control jet and sensing means for sensing a body outside the space vehicle, and the rotatable mass is a reaction wheel.

8. The control system of claim 3 with the addition of at least one attitude control jet mounted on the space vehicle parallel to the first axis of rotation, and activation means for activating the attitude control jets.

9. The control system of claim 8 with these additions:

means electrically connected to the activation means for supplying time pulse signals derived from the rotation of the space vehicle, means electrically connected to the activation means for sensing errors in the orientation of the first axis of rotation to derive orientation error signals, and said activation means having properties of activating the attitude control jets in response to the derived orientation errors.

10. The control system of claim 9 wherein the activation means has the additional property of activating the attitude control jets at time intervals that are multiples of ¼ the time of a full rotation of the space vehicle.

11. The control system of claim 8 with the addition of:

error means for sensing errors in the orientation of the first axis of rotation and for developing an error signal representative of said error in the orientation of the first axis of rotation, said error means being connected to supply said error signal to said activation means.

signal means for developing a time-pulse signal related to the rotation of the space vehicle, said signal means being connected to supply said time-pulse signal to said activation means, and the activation means being adapted to activate the control jets in response to both the error signal from the error means and the time-pulse signal from the signal means in such manner that the control jets may be activated at more than one point in each rotation of the space vehicle.

12. The control system of claim 11 wherein the activation means is adapted to activate the control jets for certain time intervals and at certain points in the rotation of the spacecraft whereby the first axis of rotation is impelled in a direction causing the error signal generated by the error means to be reduced.

13. The control system of claim 12 wherein the activation means responds to the signals from the error means and the signal means by activating each control jet at points that are multiples of one fourth a rotation of the space vehicle, whereby each jet rotates the space vehicle about two axes that are orthogonal to one another and mutually orthogonal to the first axis of rotation.

14. A method of controlling a space vehicle in orbit including the following steps:

imparting rotation to said space vehicle at a first angular velocity and about a first axis of rotation;

rotating a mass within said space vehicle about a second axis of rotation parallel to the first axis of rotation and in a direction of rotation opposite that of the space vehicle and at a second angular velocity, and controlling the relationship between said first angular velocity and said second angular velocity such that sum of the angular momentums of the space vehicle rotating at the first angular velocity and of the mass rotating at the second angular velocity is substantially zero.

15. The method of claim 14 with the additional step of applying control jet pulses in synchronism with the rotation of the space vehicle.

16. The method of claim 15 wherein the step of applying control jet pulses includes altering the orientation of the first axis of rotation by applying control jet pulses in a direction substantially parallel to the first axis of rotation.

References Cited

UNITED STATES PATENTS

| | | | |
|---|---|---|---|
| 3,339,864 | 9/1967 | Whitson | 244—1 |
| 3,341,151 | 9/1967 | Kampinsky | 244—1 |

FERGUS S. MIDDLETON, Primary Examiner

U.S. Cl. X.R.

74—5.5; 244—3.23